United States Patent Office 3,047,553
Patented July 31, 1962

3,047,553
POLYMERIZATION PROCESS USING POLY-
FLUOROAZOALKANES AS INITIATORS
Donald Drake Coffman, West Chester, Pa., assignor to
E. I. du Pont de Nemours and Company, Wilmington,
Del., a corporation of Delaware
No Drawing. Filed Nov. 30, 1959, Ser. No. 855,982
34 Claims. (Cl. 260—88.7)

This invention relates to the polymerization of unsaturated compounds with the help of a new class of polymerization initiators.

The initiators in general use for the polymerization of ethylenically unsaturated compounds, in particular the peroxide initiators, are not entirely free from disadvantages. Thus, the peroxides are somewhat hazardous to handle; they may have an oxidizing action on the polymer or other components of the reaction mixture, and they often introduce undesirable oxidizing residues in the polymer. Even such generally excellent iniators as the $\alpha,\alpha'$-dicyanoazoalkanes introduce in the resulting polymer end groups which are not wholly inert and may be objectionable in some cases. There is a need for chemically stable initiators capable of inducing the thermal or photochemical polymerization of ethylenically unsaturated monomers without furnishing reactive end groups to the resulting polymer.

In accordance with this invention, the polymerization of ethylenically unsaturated compounds under the usual polymerization conditions is carried out in the presence, as the polymerization initiator, of a polyfluoroazoalkane of the formula $R-CF_2-N=N-CF_2-R$, where R stands for fluorine, a perfluorocarbon radical or an omega-hydroperfluorocarbon radical.

The polyfluoroazoalkanes of the above formula include hexafluoroazomethane, $CF_3N=NCF_3$, and the higher perfluoroazoalkanes and $\omega$-hydroperfluoroazoalkanes which may be represented by the formula $$X-R_1-CF_2-N=N-CF_2-R_1-X$$

where $R_1$ is a divalent aliphatic perfluorcarbon radical, i.e., a radical consisting only of carbon and fluorine atoms, and X is fluorine or hydrogen. Hexafluoroazomethane, a gas boiling at $-32°$ C., has been reported in the literature. It can be prepared by the described methods or, much more conveniently, by reacting cyanogen chloride with chlorine and a fluoride of an alkali metal of atomic number 11–19 under substantially anhydrous conditions, and at a temperature of at least $150°$ C. The higher perfluoroazoalkanes and $\omega$-hydroperfluoroazoalkanes are prepared by a process which consists in reacting, at a temperature within the range of 25 to $250°$ C., a polyfluoronitrile of the formula $X-R_1-CN$, where X is fluorine or hydrogen and $R_1$ is a divalent aliphatic perfluorocarbon radical, with a halogen of atomic number 17–35 (chlorine or bromine) and a fluoride of a metal of the group of sodium, potassium, rubidium, cesium, copper, silver, mercury and lead. This reaction is represented by the following equation, using silver(I) fluoride and chlorine as the illustrative inorganic reactants:

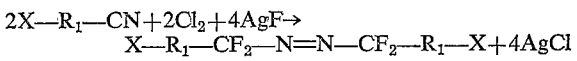

The most accessible, and therefore preferred polyfluoroazoalkanes for use as initiators in the polymerization of unsaturated monomers are hexafluoroazomethane and the perfluoroazoalkanes and $\omega$-hydroperfluoroazoalkanes of the formula $X-R_1-CF_2-N=N-CF_2-R_1-X$, where X is fluorine or hydrogen and $R_1$ is an aliphatic perfluorocarbon radical of 1 to 12 carbon atoms.

These products have good chemical stability, for example, good resistance to heat and hydrolysis. The mechanism by which they initiate the addition polymerization of ethylenically unsaturated monomers is not known with certainty, but their composition is such that any radicals they may furnish to the polymer as end groups are essentially inert and do not confer undesirable reactivity or instability to the polymer. The polyfluoroazoalkane need only be used in catalytic amounts in the polymerization mixture, e.g., in amounts between 0.0001 and 0.05 mole per mole of total polymerizable material.

For better guidance in the practice of this invention, there are given below several examples describing the preparation of representative polyfluoroazoalkanes suitable for use as polymerization initiators.

A. Perfluoroazoethane

A mixture of 20 g. of trifluoroacetonitrile, $CF_3CN$, 75 g. of silver(I) fluoride (mole ratio $AgF/CF_3CN$ 2.8:1) and 35 g. of bromine was heated in a bomb under autogenous pressure at $100°$ C. for 1 hour, $150°$ C. for 1 hour and $190°$ C. for 2 hours. The volatile reaction product (30 g.) was distilled. The fraction boiling at 16–20° C. (13 g.) was found by mass spectroscopy analysis to contain, on a molar basis, 90% of perfluoroazoethane, 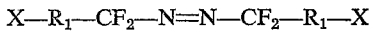 $C_2F_5N=NC_2F_5$, 3–8% of N-bromo(perfluoroethylidene)imine, $CF_3-CF=NBr$, and 1% of bromopentafluoroethane, $C_2F_5Br$. The residue in the still (6 g.) was found by infrared analysis to contain 75 mole percent of perfluoroazoethane. The conversion to perfluoroazoethane was 60%. Refractionation gave essentially pure perfluoroazoethane as a yellow-green liquid boiling at 18–20° C. at 760 mm.

B. Perfluoroazopropane

A mixture of 30 g. of perfluoropropionitrile, $C_2F_5CN$, 75 g. of silver(I) fluoride and 40 g. of bromine was heated at $100°$ C. for 1 hour, then at $160°$ C. for 3 hours under autogenous pressure. Distillation of the volatile reaction product gave 8 g. of a yellow-green liquid, B.P. 68–71° C., which was shown by nuclear magnetic resonance and elemental analysis to be perfluoroazopropane,

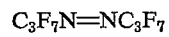

$$C_3F_7N=NC_3F_7$$

*Analysis.*—Calcd. for $C_6F_{14}N_2$: C, 19.67; F, 72.68; N, 7.65. Found: C, 19.90; F, 71.93; N, 8.03.

There was also obtained 1 g. of N-bromo(perfluoropropylidene)imine, $C_2F_5-CF=NBr$, B.P. 55–61° C.

C. Perfluoroazobutane

A mixture of 30 g. of perfluorobutyronitrile, 40 g. of silver(I) fluoride (mole ratio $AgF/C_3F_7CN$ 2:1) and 20 g. of bromine was heated at $100°$ C. for 1 hour and $160°$ C. for 2 hours under autogenous pressure. Distillation of the volatile reaction product gave 8 g. of N-bromo(perfluorobutylidene)imine, $C_3F_7-CF=NBr$, B.P. 75–77° C., and 9 g. of perfluoroazobutane, $C_4F_9N=NC_4F_9$, B.P. 100–112° C. On redistillation, perfluoroazobutane was obtained as a yellow-green liquid boiling at 113° C. at 760 mm., and identified by nuclear magnetic resonance and elemental analysis.

*Analysis.*—Calcd. for $C_8F_{18}N_2$: F, 73.40. Found: F, 72.76.

When this experiment was repeated, but with different proportions of reactants (50 g. $C_3F_7CN$, 98 g. AgF, 50 g. $Br_2$, mole ratio $AgF/C_3F_7CN$ 3:1), perfluoroazobutane was the principal reaction product (84% conversion).

D. Perfluoroazooctane

The starting material in this example was perfluorooctanenitrile, $C_7F_{15}CN$, prepared by heating with phosphoric anhydride the ammonium salt of perfluorooctanoic acid. The acid itself was a commercial sample containing approximately 70% of $CF_3(CF_2)_6COOH$, the remainder consisting of a mixture of the isomeric acids,

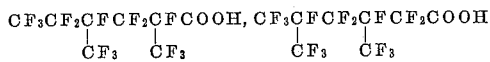

and

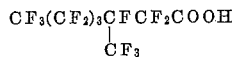

A mixture of 28 g. of perfluorooctanenitrile, 81 g. of silver(I) fluoride and 5 g. of chlorine was heated under autogenous pressure at 100° C for 1 hour, then at 140° C for 2 hours. The total reaction product was removed from the bomb and heated at 155° C. under 0.35 mm. pressure to recover the volatile material. There was thus obtained 22 g. of a liquid which solidified to a low melting solid. Redistillation of this product gave 20 g. (65% conversion) of a yellow-green, low melting solid boiling at 67–75° C. at 0.2 mm. pressure, which was shown by elemental analysis to be perfluoroazooctane, $$C_8F_{17}N=NC_8F_{17}$$

*Analysis.*—Calcd. for $C_{16}F_{34}N_2$: C, 22.17; F, 74.60. Found: C, 22.31; F, 74.50.

E. ω-Hydroperfluoroazopentane

A mixture of 39 g. of ω-hydroperfluoropentanenitrile, $H(CF_2)_4CN$, 60 g. of silver(I) fluoride and 12 g. of chlorine was heated under autogenous pressure at 75° C. for 1 hour and 125° for 1 hour. A 17-g. liquid portion was removed from the total reaction product, and another 18-g. portion of liquid reaction product was recovered by heating the solids at 125° C. under 1–2 mm. pressure. Distillation of the combined liquids gave 11 g. of a fraction (I), a colorless liquid boiling at 100–102° C. at 760 mm., and 17 g. of a fraction (II), a yellow liquid boiling at 85–86° C. at 28 mm.

Fraction (I) was identified by nuclear magnetic resonance and elemental analysis as N-chloro(ω-hydroperfluoropentylidene)imine, $H(CF_2)_4CF=NCl$, obtained in 23% conversion.

*Analysis.*—Calcd. for $C_5HF_9ClN$: F, 60.75; Cl, 12.61. Found: F, 60.54; Cl, 12.76.

Fraction (II) was identified in the same manner as ω-hydroperfluoroazopentane, $H(CF_2)_5N=N(CF_2)_5H$, obtained in 37% conversion.

*Analysis.*—Calcd. for $C_{10}H_2F_{20}N_2$: F, 71.10. Found: F, 71.55.

F. ω-Hydroperfluoroazopropane

A mixture of 18 g. of 2,2,3,3-tetrafluoropropanenitrile, $HCF_2CF_2CN$, 60 g. of silver(I) fluoride and 11 g. of chlorine was heated at 75° C. for 1 hour and 125° C. for 1 hour under autogenous pressure. The total reaction mass was removed from the bomb and heated at 150° C. under 0.15 mm. pressure to recover the volatile reaction product. Distillation of the latter gave 2 g. of a fraction (I) boiling at 58° C. at 760 mm. and 10 g. of a fraction (II) boiling at 106–108° C. at 760 mm.

Fraction (I) was identified by nuclear magnetic resonance and elemental analysis as N-chloro(ω-hydroperfluoropropylidene)imine, $HCF_2CF_2CF=NCl$, obtained in 8% conversion.

*Analysis.*—Calcd. for $C_3HF_5ClN$: F, 52.30; Cl, 19.60. Found: F, 52.49; Cl, 18.85.

Fraction (II) was identified in the same manner as ω-hydroporfluoroazopropane, $H(CF_2)_3N=N(CF_2)_3H$, obtained in 43% conversion.

*Analysis*—Calcd. for $C_6H_2F_{12}N_2$: F, 69.09; N, 8.49. Found: F, 68.83; N, 8.73.

Other polyfluoroazoalkanes which can be prepared by the same general procedure and which are effective initiators for the polymerization of ethylenically unsaturated monomers include perfluoroazoisobutane,

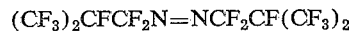

perfluoroazohexane,

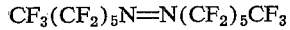

ω-hydroporfluoroazononane,

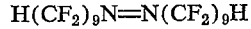

perfluoroazodecane

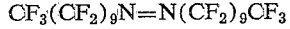

ω-hydroperfluoroazotridecane

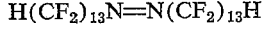

and the like.

The process of this invention is of general application to the addition polymerization of polymerizable compounds having ethylenic unsaturation, i.e., containing at least one non-aromatic $>C=C<$ group. The term "polymerization" includes, as usual, the polymerization of one ethylenically unsaturated monomer alone as well as the copolymerization of two or more such monomers.

Thus, the above-defined polyfluoroazoalkanes are effective initiators for the polymerization of the various classes of ethylenically unsaturated compounds which are capable of addition polymerization, particularly of the free radical-initiated type. Such compounds, the resulting polymers and their uses are well known in the art and need not be enumerated at length. As is known, the principal classes of addition polymerizable compounds include the ethylenically unsaturated hydrocarbons, and halohydrocarbons especially the vinyl and vinylidene hydrocarbons and their chlorides, bromides, fluorides, e.g., the perfluoroalkenes and chlorofluoroalkenes, the vinyl esters of carboxylic acids; the acrylyl compounds, e.g., the acrylyl, alkacrylyl and haloacrylyl acids, esters, nitriles and amides; the N-vinyl imides; the vinyl aldehydes and ketones; the N-vinyllactams; the vinyl ethers; the vinyl pyridines, and the like. Compounds having more than one ethylenic carbon-to-carbon double bond, particularly the diene hydrocarbons and halohydrocarbons can also be addition polymerized with the help of polyfluoroazoalkanes.

Specific unsaturates polymerizable by the process of this invention, besides those illustrated in the detailed examples given below, include the following, among others: propylene, isobutylene, octadecene-1, styrene, α-methylstyrene, vinylnaphthalene, 1,3-butadiene, isoprene, vinyl butyrate, vinyl laurate, vinyl palmitate, vinyl salicylate, isobutenyl acetate, acrylic acid, ethyl acrylate, methyl methacrylate, n-octyl methacrylate, methoxymethyl methacrylate, β-diethylaminomethyl methacrylate, ethyl α-chloroacrylate, methacrylonitrile, acrylamide, methacrylamide, chlorotrifluoroethylene, 1,1-dichloro-2,2-difluoroethylene, perfluoroheptene-1, perfluorononene-1, ethyl trifluoroethylene, 8-hydroperfluorooctene-1, n-dodecyltrifluoroethylene, phenyltrifluoroethylene, α-chlorostyrene, vinyl chloride, vinyl fluoride, vinylidene bromide, vinylidene fluoride, 1-chloro-1-fluoroethylene, 2-chloro-1,3-butadiene, N-vinyl phthalimide, N-vinyl succinimide, acrolein, methylvinyl ketone, N-vinyl butyrolactam, N-vinyl caprolactam, vinyl ethyl ether, vinyl isobutyl ether, and vinyl pyridine.

Illustrative copolymers obtainable by the process of this invention, in addition to those shown in the detailed examples which follow, include ethylene/tetrafluoroethylene copolymers, acrylonitrile/isobutylene copolymers, ethylene/vinyl acetate copolymers, vinyl chloride/vinyl acetate copolymers and methyl methacrylate/styrene copolymers. Even unsaturates which are per se not polymerizable or difficultly polymerizable, such as the dialkyl esters of maleic or fumaric acids, can be copolymerized with readily polymerizable monomers such as styrene or vinyl acetate.

The most readily available addition polymerizable monomers for use in this process are those having from 2 to 18 carbon atoms, and they are therefore preferred. Within this group, the best results are obtained with monoethylenically unsaturated monomers having terminal unsaturation, particularly those having a terminal methylene, $CH_2=$, group or a terminal difluoromethylene, $CF_2=$, group. Especially preferred, because they are most successfully amenable to polymerization by this process, are the monoethylenically unsaturated vinyl and vinylidene hydrocarbons, vinyl carboxylates, esters and nitriles of acrylic and α-alkacrylic acids, and polyfluoroalkenes having a terminal difluoromethylene group.

Polymerization is carried out under the well known conditions normally used in the art to effect addition polymerization. Thus, the reaction can be activated by the influence of either heat or light, or a combination of both.

Thermal polymerization is normally carried out in a temperature range of 75 to 200° C., although lower temperatures, e.g., 50° C., are sometimes sufficient for a practical reaction rate, and higher temperatures, e.g., up to 300° C. can be used with stable monomers, particularly when the reaction time is kept at a minimum, for example in a continuous process. Thermal polymerization can be conducted at atmospheric or even reduced pressure when the monomer and initiator are sufficiently high boiling, or in sealed vessels with the more volatile or gaseous monomers and initiators, either under the autogenous pressure developed by the ingredients at the operating temperature or under additional pressure, e.g., up to 5000 atmospheres, supplied either by the gaseous monomer or an inert gas.

Photochemical polymerization does not normally require high temperatures. It can be carried out at temperatures as low as −50° C. or even lower, and generally proceeds well in the neighborhood of ordinary temperature, i.e., in the range 0–50° C. However, higher temperatures, for example up to 100° C., can be used and are sometimes desirable. The pressure is immaterial and may range from subatmospheric pressures to the maximum pressure the equipment can withstand. The radiant energy can be in the form of either visible light or ultraviolet light. Thus, wavelengths as short as about 1800 A. (the limit of transmission of quartz) and up to about 7000 A. can be used. Since 3200 A. is the lower limit of transmission of ordinary glass, wavelengths between 3200 and 7000 A. are preferred. Any convenient source of visible or ultraviolet light or mixtures of them can be used, for example the mercury vapor arc, tungsten bulb of suitable intensity, sun lamps, etc. In the examples which follow the light source was at a distance of from about 15–50 cm. Ordinary sunlight is another effective source of light for carrying out the photopolymerization.

The polymerization, whether thermal or photochemical, may be carried out by any of the conventional methods, e.g., by the bulk, solution, emulsion or granular techniques. Better results are generally achieved with bulk polymerization or solution polymerization in a substantially inert, unpolymerizable organic liquid solvent, which is at least a partial solvent for the monomer e.g., a saturated fluorocarbon liquid under normal conditions.

The invention is illustrated in greater detail by the following examples.

*Example I*

A 100-ml. glass tube was cooled in liquid nitrogen, and charged with 8.4 g. of tetrafluoroethylene and 0.14 g. of hexafluoroazomethane, after which the tube was evacuated to remove the air and sealed. The tube was irradiated with the light from a 110 volt, 275 watt sun lamp at 0–30° C. for 1.5 hours. There was obtained 7.2 g. of white polytetrafluoroethylene, which retained very good color after hot pressing. The polymer had a molecular weight of approximately 2,000,000, as determined by melt viscosity. No end groups were apparent in its infrared spectrum.

Similar results were obtained under similar conditions except that only 0.017 g. of hexafluoroazomethane was used for 10 g. of tetrafluoroethylene. Conversion to the polymer was 84% after one hour's exposure to the light of the sun lamp. When the hexafluoroazomethane was omitted, no polymerization took place under the same conditions.

*Example II*

A 100-ml. glass tube cooled in liquid nitrogen was charged with 8 g. of tetrafluoroethylene, 6 g. of hexafluoropropylene and 0.2 g. of hexafluoroazomethane. After evacuating and sealing, the tube was irradiated with the light of a sun lamp for 4 hours at a temperature of 20–60° C. There was obtained 5.7 g. of a white copolymer of tetrafluoroethylene and hexafluoropropylene containing approximately 3 mole percent of polymerized hexafluoropropylene, as indicated by its infrared spectrum. The molecular weight of this copolymer was approximately 300,000–500,000. No end groups were detectable in the infrared spectrum of the copolymer.

Copolymerization also took place in a similar system placed in a steel bomb and irradiated through a small quartz window by a mercury vapor lamp for 4 hours at 75° C.

*Example III*

An 80-ml. stainless steel bomb charged with 30 g. of hexafluoropropylene, 23.8 g. of tetrafluoroethylene, 0.5 g. of hexafluoroazomethane, 20 g., as a solvent, of perfluoro(dimethylcyclobutane) [Hauptschein et al., J. Am. Chem. Soc. 80, 842 (1958)], and 0.05 g. of silver difluoride (the latter possibly serving to lower the polymerization temperature) was heated for 6 hours at 150° C. under autogenous pressure. The solid polymer so obtained was washed in a high speed mixer successively with dilute nitric acid, acetone, aqueous ammonia and water and dried under reduced pressure. There was obtained 18 g. of a tetrafluoroethylene/hexafluoropropylene copolymer containing 8 mole percent of polymerized hexafluoropropylene, as indicated by its infrared spectrum, which also showed the absence of detectable end groups. The molecular weight of the copolymer was approximately 1,000,000, which is about twice that of commercial copolymers of this type.

*Example IV*

A 100-ml. glass tube charged with 5.3 g. of acrylonitrile and 0.017 g. of hexafluoroazomethane was cooled in liquid nitrogen, evacuated and sealed. The tube was exposed to the light of a sun lamp for 3 hours at 30–60° C. There was obtained 1.3 g. of polyacrylonitrile which was partly soluble in boiling dimethylformamide, and 3.5 g. of recovered monomer. The polymer yield was 72%, based on the unrecovered monomer.

*Example V*

An 80-ml. stainless steel bomb charged with 30 g. of vinylidene fluoride, 30 g. of hexafluoropropylene and 0.5 g. of hexafluoroazomethane was heated for 12 hours at 170° C. under autogenous pressure. There was obtained 9.4 g. of a tough, colorless copolymer of vinylidene fluoride and hexafluoropropylene. This copolymer contained 72% by weight of polymerized vinylidene fluoride and had an inherent viscosity of 0.73, measured on a 0.1% solution in an 87:13 by weight mixture of tetrahydrofuran and dimethylformamide at 30° C.

*Example VI*

A 100-ml. glass tube charged with 3.2 g. of vinylidene fluoride, 7.5 g. of hexafluoropropylene and 0.017 g. of hexafluoroazomethane was exposed to the light of two sun lamps for 6 hours at 32–80° C. There was obtained 1.74 g. of a white granular copolymer containing 53% by weight of polymerized vinylidene fluoride. This copolymer had an inherent viscosity, determined as in Example V, of 0.77.

Example VII

A 50-ml. glass tube charged with 10 g. of vinyl acetate, 1 g. of methanol (to limit the molecular weight of the polymer) and 0.12 g. of hexafluoroazomethane was cooled in liquid nitrogen, evacuated and sealed. The tube was irradiated with the light of two sun lamps for 5 hours at 35–45° C. The product in the tube was then a colorless, glassy polymer. This was dissolved in 300 ml. of hot xylene and precipitated by pouring the solution into 400 ml. of hexane with rapid stirring. The precipitate was dried under vacuum over phosphorus pentoxide to give 9.9 g. of colorless, rubbery polyvinyl acetate.

Example VIII

An 80-ml. stainless steel bomb charged with 87 g. of ethylene and 0.5 g. of hexafluoroazomethane was heated for 8 hours at 180° C. under autogenous pressure. There was obtained 8 g. of tough, cellular polyethylene. In comparison, when ethylene was heated under the same conditions and at the same temperature, but in the absence of hexafluoroazomethane, only half the amount of polymer (4 g.) was obtained after a much longer heating period (13 hours).

Example IX

A mixture of tetrafluoroethylene, carbon monoxide and perfluoroazopropane in the mole ratios of 1:0.62:0.02 was placed in a glass tube and exposed to the light of a sun lamp at 0° C. for 4 hours. A white fluffy tetrafluoroethylene polymer was obtained. Its infrared spectrum indicated that the carbon monoxide had not taken part in the polymerization.

Example X

Into a stainless steel, 100-ml. reactor was charged 20 ml. of perfluoro(dimethylcyclobutane), 0.14 g. of perfluoroazooctane and 303 g. of tetrafluoroethylene. The reaction mixture was heated at 175° C. for a period of 2 hours under autogenous pressure with moderate agitation. On cooling to room temperature, unreacted tetrafluoroethylene was bled off, the remaining reaction mixture removed from the reactor and the solvent evaporated. On drying, 6 g. of solid polytetrafluoroethylene was obtained.

Example XI

Following the procedure of Example X, 30 g. of tetrafluoroethylene was polymerized in 35 ml. of perfluoro(dimethylcyclobutane) employing 0.15 g. of perfluoroazobutane as the initiator at a temperature of 200° C. On drying, 12.7 g. of solid polytetrafluoroethylene was obtained.

Example XII

The procedure of Example X was followed employing 20 g. of tetrafluoroethylene, 20 ml. of perfluoro(dimethylcyclobutane) as solvent and 0.10 g. of omega-hydroperfluoroazopentane as the initiator, at a temperature of 160° C. On drying, 9.5 g. of solid polytetrafluoroethylene was obtained.

Example XIII

A mixture of 30 g. of hexafluoropropylene and 25 g. of tetrafluoroethylene were polymerized in 35 ml. of perfluoro(dimethylcyclobutane) employing 0.08 g. of omega-hydroperfluoroazopentane at a temperature of 200° C. in accordance with the procedure of Example X. On drying, 3.1 g. of a hexafluoropropylene-tetrafluoroethylene copolymer was obtained which had a melt viscosity of $2.14 \times 10^4$ poises at 380° C. and a hexafluoropropylene content of approximately 26%. The copolymer could be compression molded into clear tough films.

Example XIV

A stainless steel reactor was charged with 0.5 g. of hexafluoroazomethane and about 20 ml. of perfluoro(dimethylcyclobutane), and hexafluoropropylene was introduced in the reactor at a pressure of 5000 atmospheres. The reactor was heated with agitation at 200° C. for a period of 2 hours, during which a pressure drop of 600 atmospheres took place. After cooling and opening the reactor, the solvent was flashed off, leaving 17 g. of hexafluoropropylene polymer as a solid having an inherent viscosity of 0.35.

This invention provides a process whereby the addition polymerization of unsaturated compounds is effected with the help of initiators offering several advantages over conventional initiators. Thus, the polyfluoroazoalkanes are safe to handle, being substantially insensitive toward explosion by heat or impact. Thus, they are less hazardous than previously proposed initiators, especially in high temperature polymerization processes. In view of their relatively low chemical reactivity, the polyfluoroazoalkanes have little tendency to react with or have a deleterious effect on conventional ingredients such as solvents, dyes, pigments, etc. which may be present in the polymerization mixture. They do not introduce oxidizing catalyst residues in the polymers, and such highly fluorinated alkyl end groups as they may contribute have better resistance to oxidation and chemical attack in general than the end groups furnished by conventional initiators.

What is claimed is:

1. A method for polymerizing ethylenically unsaturated compounds which comprises subjecting said compounds to polymerization conditions under the influence of heat and in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

2. The process of claim 1 wherein the polyfluoroaxoalkane is hexafluoroazomethane.

3. The process of claim 1 wherein the polyfluoroazoalkane is a perfluoroazoalkane.

4. The process of claim 1 wherein R of the formula represents an omega-hydroperfluorocarbon radical.

5. A method for polymerizing ethylenically unsaturated compounds which comprises subjecting said compounds to a temperature in the range of about 50° C. to 300° C. in the presence of a polyfluoroazoalkane of the formula R—CF$_2$—N=N—CF$_2$—R where R represents a member of the group consisting of fluorine, a perfluorocarbon radical and an omega-hydrofluorocarbon radical, the amount of polyfluoroazoalkane being between 0.0001 and 0.05 mole per mole of total polymerizable material.

6. The method of claim 5 carried out at a temperature in the range of from about 75° C. to 200° C.

7. A method for photochemically polymerizing ethylenically unsaturated compounds which comprises subjecting said compounds to light in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

8. A method for polymerizing ethylenically unsaturated hydrocarbons and halohydrocarbons which comprises subjecting said compounds to polymerization conditions under the influence of heat in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

9. A method for polymerizing perfluoroalkenes which comprises subjecting them to polymerization conditions under the influence of heat in the presence of a polyfluoroazoalkane of the formula

R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

10. The method of claim 9 wherein the polyfluoroazoalkane is hexafluoroazomethane.

11. A method for polymerizing vinyl esters of carboxylic acids which comprises subjecting said esters to polymerization conditions under the influence of heat in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

12. A method for polymerizing acrylyl compounds comprising subjecting said compounds to polymerization conditions under the influence of heat in the presence of a polyfluoroazoalkane of the formula R—CF$_2$—N=N—CF$_2$—R were R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

13. A method for making polyacrylonitrile comprising subjecting acrylonitrile to polymerization conditions under the influence of heat in the presence of hexafluoroazomethane, the amount of hexafluoroazomethane being between 0.0001 and 0.05 mole per mole of total polymerizable material.

14. A method for making polytetrafluoroethylene which comprises subjecting tetrafluoroethylene to polymerization conditions under the influence of heat in the presence of a polyfluoroazoalkane of the formula

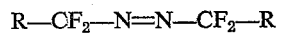

where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

15. The process of claim 14 wherein the polyfluoroazoalkane is hexafluoroazomethane.

16. A method for making polyethylene which comprises subjecting ethylene to polymerization conditions under the influence of heat the presence of hexafluoroazomethane, in an amount from between 0.0001 and 0.05 mole per mole of total polymerizable material.

17. A process for copolymerizing tetrafluoroethylene and hexafluoropropylene which comprises subjecting said compounds to polymerization conditions under the influence of heat in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

18. A method for making polyvinyl acetate which comprises subjecting vinyl acetate to polymerization conditions under the influence of heat in the presence of hexafluoroazomethane in an amount from between 0.0001 and 0.05 mole per mole of total polymerizable material.

19. A method for polymerizing ethylenically unsaturated hydrocarbons and halohydrocarbons, which comprises subjecting said compounds to light of a wavelength in the range of about 1800 A. to 7000 A. in the presence of a polyfluoroazoalkane of the formula

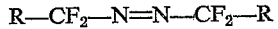

where R represents fluorine, a perfluorocarbon radical, and an omega-hydroperfluorocarbon radical, the amount of polyfluoroazoalkane being between 0.0001 and 0.05 mole per mole of total polymerizable material.

20. A method for polymerizing tetrafluoroethylene which comprises subjecting it to light in the presence of hexafluoroazomethane in an amount from between 0.0001 and 0.05 mole per mole of total polymerizable material.

21. The process of claim 7 wherein the polyfluoroazoalkane is hexafluoroazomethane.

22. The process of claim 7 wherein the polyfluoroazoalkane is a perfluoroazoalkane.

23. The process of claim 7 wherein R of the formula represents an omega-hydroperfluorocarbon radical.

24. The method of claim 7 wherein the ethylenically unsaturated compound is a member of the group consisting of unsaturated hydrocarbons and halohydrocarbons.

25. The method of claim 7 wherein the ethylenically unsaturated compound is a perfluoroalkene.

26. The method of claim 25 wherein the polyfluoroazoalkane is hexafluoroazomethane.

27. The method of claim 7 wherein the ethylenically unsaturated compound is a vinyl ester of a carboxylic acid.

28. The process of claim 7 wherein the ethylenically unsaturated compound is an acrylyl compound.

29. A method for making polyacrylonitrile which comprises subjecting acrylonitrile to polymerization conditions under the influence of light in the presence of hexafluoroazomethane in an amount from between 0.0001 and 0.05 mole per mole of total polymerizable material.

30. The method of claim 7 wherein the ethylenically unsaturated compound is tetrafluoroethylene.

31. The method of claim 30 wherein the polyfluoroazoalkane is hexafluoroazomethane.

32. A method for making polyethylene which comprises subjecting ethylene to polymerization conditions under the influence of light in the presence of hexafluoroazomethane, the amount of hexafluoroazomethane being between 0.0001 and 0.05 mole per mole of total polymerizable material.

33. A process for copolymerizing tetrafluoroethylene and hexafluoropropylene which comprises subjecting said compounds to polymerization conditions under the influence of light in the presence of a polyfluoroazoalkane of the formula R—CF$_2$—N=N—CF$_2$—R where R represents a member of the group consisting of fluorine, a perfluorocarbon radical and an omega-hydroperfluorocarbon radical, the amount of polyfluoroazoalkane being between 0.0001 and 0.05 mole per mole of total polymerizable material.

34. A method for making polyvinyl acetate which comprises subjecting vinyl acetate to polymerization conditions under the influence of light in the presence of hexafluoroazomethane in an amount from between 0.0001 and 0.05 mole per mole of total polymerizable material.

References Cited in the file of this patent

UNITED STATES PATENTS

| | | |
|---|---|---|
| 2,718,515 | Thomas | Sept. 20, 1955 |
| 2,912,429 | Tullock | Nov. 10, 1959 |

FOREIGN PATENTS

| | | |
|---|---|---|
| 622,374 | Great Britain | May 2, 1949 |

UNITED STATES PATENT OFFICE

CERTIFICATE OF CORRECTION

Patent No. 3,047,553 July 31, 1962

Donald Drake Coffman

It is hereby certified that error appears in the above numbered patent requiring correction and that the said Letters Patent should read as corrected below.

Column 9, line 21, for "were" read -- where --; line 48, after "heat" insert -- in --.

Signed and sealed this 8th day of January 1963.

SEAL)
Attest:

ERNEST W. SWIDER
Attesting Officer

DAVID L. LADD
Commissioner of Patents